(12) United States Patent
Janakiraman et al.

(10) Patent No.: US 8,549,850 B2
(45) Date of Patent: Oct. 8, 2013

(54) EXHAUST GAS ASPIRATOR

(75) Inventors: Arun Janakiraman, Fitchburg, WI (US); Shiming Feng, Madison, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 591 days.

(21) Appl. No.: 12/263,018

(22) Filed: Oct. 31, 2008

(65) Prior Publication Data

US 2010/0107616 A1 May 6, 2010

(51) Int. Cl.
*F01N 3/02* (2006.01)
(52) U.S. Cl.
USPC ............... 60/317; 60/219; 60/319; 60/320
(58) Field of Classification Search
USPC .................... 60/317, 319, 318, 303
See application file for complete search history.

(56) References Cited

U.S. PATENT DOCUMENTS

| | | | | |
|---|---|---|---|---|
| 2,055,453 A | * | 9/1936 | Horton | 181/262 |
| 2,370,062 A | | 2/1945 | Mercier | |
| 2,382,386 A | * | 8/1945 | Arms | 239/214.25 |
| 2,548,563 A | * | 4/1951 | Smith | 181/262 |
| 2,858,853 A | * | 11/1958 | Lyon | 239/601 |
| 2,919,720 A | | 1/1960 | Nicholls | |
| 3,605,389 A | | 9/1971 | Buttler | |
| 3,741,730 A | | 6/1973 | Alcott | |
| 3,973,916 A | * | 8/1976 | Shelton | 422/174 |
| 4,050,903 A | * | 9/1977 | Bailey et al. | 422/177 |
| 4,066,214 A | | 1/1978 | Johnson | |
| 4,077,206 A | | 3/1978 | Ayyagari | |
| 4,094,645 A | * | 6/1978 | Bailey | 422/180 |
| 4,227,651 A | * | 10/1980 | Abe | 239/428 |
| 4,361,206 A | * | 11/1982 | Tsai | 181/255 |
| 4,685,534 A | | 8/1987 | Burstein et al. | |
| 4,719,751 A | | 1/1988 | Kume et al. | |
| 4,909,346 A | | 3/1990 | Torkelson | |
| 5,058,704 A | | 10/1991 | Yu | |
| 5,396,767 A | * | 3/1995 | Suzuki | 60/298 |
| 5,611,203 A | | 3/1997 | Henderson et al. | |
| 5,755,092 A | | 5/1998 | Dessale et al. | |
| 5,884,472 A | | 3/1999 | Presz, Jr. et al. | |
| 6,021,639 A | | 2/2000 | Abe et al. | |
| 6,185,934 B1 | * | 2/2001 | Teboul | 60/297 |

(Continued)

FOREIGN PATENT DOCUMENTS

| | | |
|---|---|---|
| CN | 2443152 Y | 8/2001 |
| JP | 51122212 A | 10/1976 |
| JP | 2003-065156 | 3/2003 |

OTHER PUBLICATIONS

U.S. Appl. No. 11/333,656 Office Action mailed May 15, 2007.

(Continued)

*Primary Examiner* — Thomas Denion
*Assistant Examiner* — Patrick Maines
(74) *Attorney, Agent, or Firm* — Kunzler Law Group, PC (57) ABSTRACT

According to one representative embodiment, an aspirator for cooling exhaust gas from an internal combustion engine includes a nozzle section, an expansion section, and an air entrainment section. The nozzle section is communicable in exhaust receiving communication with the internal combustion engine. The nozzle section includes a plurality of nozzles through which an exhaust gas stream is flowable. The expansion section is communicable in exhaust receiving communication with the plurality of nozzles. The air entrainment section is communicable in air supplying communication with the expansion section. The air is mixable with the exhaust gas within the expansion section.

17 Claims, 8 Drawing Sheets

(56) References Cited

U.S. PATENT DOCUMENTS

| | | | |
|---|---|---|---|
| 6,233,920 | B1 | 5/2001 | Presz, Jr. et al. |
| 6,425,382 | B1 | 7/2002 | Marthaler et al. |
| 6,443,675 | B1 | 9/2002 | Kopras et al. |
| 6,540,046 | B1 * | 4/2003 | Schuhmacher et al. ...... 181/231 |
| 6,651,773 | B1 | 11/2003 | Marocco |
| 6,776,146 | B1 | 8/2004 | Ricart-Ugaz et al. |
| 6,810,867 | B2 | 11/2004 | Schmid et al. |
| 6,889,673 | B2 | 5/2005 | Bender et al. |
| 6,910,550 | B2 | 6/2005 | Schlossarczyk et al. |
| 6,968,680 | B2 | 11/2005 | van Nieuwstadt et al. |
| 7,028,663 | B1 | 4/2006 | Kim |
| 7,174,992 | B2 * | 2/2007 | Kicinski ...................... 181/255 |
| 7,266,943 | B2 | 9/2007 | Kammel |
| 7,316,109 | B2 | 1/2008 | Clerc et al. |
| 7,461,506 | B2 | 12/2008 | McNally et al. |
| 7,628,012 | B2 * | 12/2009 | Eifert et al. ..................... 60/319 |
| 7,971,432 | B2 * | 7/2011 | Troxler ........................... 60/324 |
| 8,109,083 | B2 * | 2/2012 | Gibson et al. ................... 60/317 |
| 2006/0112683 | A1 | 6/2006 | Huber |
| 2006/0266022 | A1 | 11/2006 | Woerner et al. |
| 2006/0277901 | A1 * | 12/2006 | Allegre et al. .................. 60/317 |
| 2007/0039318 | A1 | 2/2007 | Krajewski et al. |
| 2007/0095057 | A1 | 5/2007 | Field et al. |
| 2007/0163247 | A1 | 7/2007 | Ryan et al. |
| 2007/0163249 | A1 * | 7/2007 | Clerc et al. ..................... 60/320 |
| 2008/0099276 | A1 | 5/2008 | Bach |
| 2009/0113882 | A1 * | 5/2009 | Gibson et al. .................. 60/319 |
| 2009/0139217 | A1 * | 6/2009 | Eifert et al. ..................... 60/317 |
| 2009/0282818 | A1 * | 11/2009 | Keller ............................. 60/317 |

OTHER PUBLICATIONS

U.S. Appl. No. 11/333,656 Notice of Allowance mailed Aug. 21, 2007.
CN Application No. 2007800024038 Office Action dated Nov. 13, 2009.
CN Application No. 2007800024038 Office Action dated Dec. 24, 2010.
JP Application No. 2008-550561 Office Action dated Aug. 2, 2011.
JP Application No. 2008-550561 Final Office Action dated May 29, 2012.
PCT/US2007/060643 International Search Report and Written Opinion mailed Oct. 19, 2007.
PCT/US2007/060640 International Search Report and Written Opinion mailed Sep. 22, 2008.
CN Application No. 2007800024235 Office Action dated Feb. 12, 2010.
CN Application No. 2007800024235 Office Action dated Feb. 21, 2012.
CN Application No. 2007800024235 Office Action dated Jul. 26, 2012.
U.S. Appl. No. 11/333,136 Office Action mailed Sep. 15, 2009.
U.S. Appl. No. 11/333,136 Notice of Allowance mailed Mar. 2, 2010.

* cited by examiner

| Active Regeneration Condition | | |
|---|---|---|
| | Multiple Nozzle Aspirator 40 | Single Nozzle Aspirator 500 |
| Inlet Temperature | 873 K | 873 K |
| Motive Flow Rate | 0.232 kg/s | 0.232 kg/s |
| Aspirated Flow Rate | 0.2676 kg/s | 0.28036 kg/s |
| Aspiration Ratio | 1.15 kg/s | 1.21 kg/s |
| Pressure Drop | 3630 Pa | 3543 Pa |
| Average Outlet Temperature | 559 K | 533 K |
| Max Temperature at Outlet | 625 K | 821 K |
| dT | 314 K | 340 K |
| | | |
| Tmax/Tavg at Outlet | 1.12 | 1.54 |

FIG. 15

| Active Regeneration Condition | | |
|---|---|---|
| | Multiple Nozzle Aspirator 40 | Single Nozzle Aspirator 500 |
| Inlet Temperature | 873 K | 873 K |
| Motive Flow Rate | 0.04871 kg/s | 0.04871 kg/s |
| Aspirated Flow Rate | 0.05524 kg/s | 0.0573 kg/s |
| Aspiration Ratio | 1.13 kg/s | 1.18 kg/s |
| Pressure Drop | 157 Pa | 153 Pa |
| Average Outlet Temperature | 560 K | 540 K |
| Max Temperature at Outlet | 604 K | 801 K |
| dT | 313 K | 333 K |
| | | |
| Tmax/Tavg at Outlet | 1.08 | 1.48 |

FIG. 16

EXHAUST GAS ASPIRATOR

FIELD

This invention relates to exhaust systems, and more particularly to an exhaust gas aspirator that cools exhaust gas prior to exiting the exhaust system.

BACKGROUND

Environmental regulations are becoming increasingly strict with regard to engine exhaust emissions such as nitrogen oxides (NOx) and particulate matter. More stringent environmental regulations with regard to diesel engine particulate emissions has warranted the need for diesel particulate filters and/or other exhaust aftertreatment devices, such as NOx adsorbers, to be placed in the exhaust gas stream for removing or reducing harmful exhaust emissions before the exhaust is permitted to enter the atmosphere.

Typically, exhaust aftertreatment systems must initiate and control regeneration of the particulate filters, NOx adsorbers, and other exhaust treatment devices from time to time as the devices fill up with soot, NOx, or the like. Regenerating the devices removes some or all of the particulates built up on the devices by oxidizing the particles. As an example, regeneration of a particulate filter is done by increasing the temperature of the filter to a level where the soot is oxidized, e.g., above 400° C., and maintaining that temperature for a desired period of time, e.g., several minutes or longer, depending on circumstances including the size of the filter, the amount of soot on the filter, the uniformity level of the soot, etc.

The temperature of the filter is increased by increasing the temperature of the exhaust gas passing through the filter by any of various techniques known in the art. Although increasing the exhaust gas temperatures can effectuate the positive and desirable result of regenerating an exhaust aftertreatment device, exhaust gas temperatures during such regenerating events can reach extreme levels, e.g., 650° C. or more, possibly causing undesirable side effects. For example, the high exhaust temperatures required for filter regenerations usually means the exhaust leaving the tailpipe of the vehicle is much hotter than it would be during normal operation, particularly at stationary or low-speed operation. This creates a potential safety hazard with regard to the heat flux of the gases leaving the tailpipe and creating discomfort or injury to humans, animals, or plants in proximity. Moreover, extreme exhaust gas temperatures resulting from regeneration events can increase the surface temperature of exhaust train components, increase the risk of fire hazards, and cause damage to street surfaces and other objects. Additionally, extreme exhaust gas temperatures can discolor, e.g., blacken, tailpipe components, especially tailpipes with chromed outer surfaces.

Several approaches have been employed for mitigating heat from an exhaust gas stream to reduce the temperature of the exhaust as it exits the tailpipe. For example, some fire trucks are equipped with a water spray device at the exhaust outlet for exhaust cooling, but such a scheme is limited to a situation where there is a ready water supply as well as experienced firefighters. Other approaches include exhaust diffusion devices coupled to the outlet of the tailpipe. The diffusion devices are configured to cool the exhaust gas leaving the tailpipe by diluting and dispersing the exhaust gas. However, such diffusion devices are not designed to cool the exhaust gas at the tailpipe outlet, but rather to reduce the temperature of the exhaust gas at a regulated distance, e.g., six inches, away from the outlet of the tailpipe to a temperature below a regulated maximum temperature. Although some conventional diffusion devices are successful at achieving a desirable mitigation of exhaust gas heat outside of the tailpipe, e.g., at a distance away from the tailpipe outlet, such devices do not achieve cooler exhaust gas temperatures at the tailpipe outlet. Accordingly, the temperature of exhaust at the tailpipe outlet is still extremely high, which can be dangerous to people and objects near the tailpipe and cause bluing or blackening of the tailpipe itself.

To achieve cooler exhaust gas temperatures at the tailpipe outlet before, during, or after regeneration events, exhaust aspirators positioned upstream of the tailpipe outlet have been developed to entrain ambient air into the exhaust gas stream before the exhaust gas exits the tailpipe. Ambient air is entrained into the exhaust gas stream by creating an exhaust pressure drop within the aspirator that causes a vacuum effect to suck in the ambient air. The pressure drop is created by accelerating the exhaust gas through a nozzle and allowing the exhaust gas to expand upon exiting the nozzle. Typically, the pressure drop must be below a certain threshold (e.g., below 1 inch Hg) to prevent harmful levels of engine backpressure. The ambient air is mixed with the exhaust gas stream and, being cooler than the exhaust gas, reduces the temperature of the exhaust gas before it exits the tailpipe. Accordingly, the temperature of the exhaust gas is cooled within the tailpipe.

Conventional exhaust aspirators suffer from several drawbacks however. Generally, the less the ambient air and exhaust gas is mixed within the aspirator or tailpipe, the higher the radial temperature gradient, and the lower the exhaust gas temperature uniformity at the tailpipe outlet. Typically, inadequate mixing results in some portions of exhaust gas being at a generally uniform lower exhaust gas temperature at the tailpipe outlet and some concentrated pockets of exhaust gas remaining at extremely high temperatures. The concentrated pockets can be harmful and cause bluing of the tailpipe. Conventional exhaust aspirators, such as those with a single nozzle, may not adequately mix the entrained ambient air with the exhaust gas to achieve a suitable radial temperature gradient for a given exhaust pressure drop threshold. To achieve better mixing and exhaust uniformity at the aspirator outlet, some conventional exhaust aspirators are lengthened. However, longer aspirators can be more expensive to manufacture due to additional material and can occupy more valuable space within the exhaust system that could be used for other components.

Accordingly, an exhaust aspirator is desired that more adequately mixes entrained air with exhaust gas within a tailpipe to achieve a lower exhaust gas radial temperature gradient and greater exhaust gas uniformity at the tailpipe outlet, less expensive to manufacture, and occupies less space than conventional aspirators.

SUMMARY

The subject matter of the present application has been developed in response to the present state of the art, and in particular, in response to the problems and needs in the art that have not yet been fully solved by currently available exhaust aspirators. Accordingly, the subject matter of the present application has been developed to provide an exhaust gas aspirator, and associated systems and methods, for cooling exhaust gas that overcomes at least some shortcomings of the prior art aspirators.

According to one representative embodiment, an aspirator for cooling exhaust gas from an internal combustion engine includes a nozzle section, an expansion section, and an air entrainment section. The nozzle section is communicable in exhaust receiving communication with the internal combustion engine. The nozzle section includes a plurality of nozzles through which an exhaust gas stream is flowable. The expansion section is communicable in exhaust receiving communication with the plurality of nozzles. The air entrainment section is communicable in air supplying communication with the expansion section. The air is mixable with the exhaust gas within the expansion section.

In some implementations, each of the plurality of nozzles includes a converging portion in a direction of exhaust gas flow. The plurality of nozzles can include at least four nozzles. In some instances, each of the nozzles is similarly shaped. In other implementations, at least one of the plurality of nozzles defines a cross-sectional area having a first shape and at least one of the plurality of nozzles defines a cross-sectional area having a second shape. The first shape is different than the second shape. The nozzles can define any of various cross-sectional shapes. For example, each of the plurality of nozzles can define a cross-sectional area having one of a substantially circular, conical frustum, bean, and triangular shape.

The air entrainment section of the aspirator can include a plurality of apertures exposed to ambient air. Moreover, the air entrainment section can at least partially surround the plurality of nozzles and expansion section.

According to another embodiment, an apparatus for cooling exhaust gas from an internal combustion engine can include a first elongate tubular member including an exhaust inlet and exhaust outlet. The apparatus also includes a second elongate tubular member positioned within the first elongate tubular member between the exhaust inlet and outlet. Further, the apparatus includes a plurality of nozzles positioned within the first elongate tubular member between the second elongate tubular member and the exhaust inlet. Additionally, the apparatus includes a plurality of apertures formed in the first elongate tubular member between the exhaust inlet and outlet.

In some implementations, the plurality of apertures are located radially outward from at least one of the second elongate tubular member and plurality of nozzles.

In yet some implementations, each of the plurality of nozzles includes a nozzle inlet and nozzle outlet and the second elongate tubular element includes an inlet. Exhaust can be flowable from the nozzle outlets into the inlet of the second elongate tubular element. A combined cross-sectional area of the nozzles at the nozzle outlets can be less than an area of the second elongate tubular member at the inlet of the second elongate tubular member.

In certain implementations, each of the plurality of nozzles includes a length substantially parallel to an exhaust flow direction and a height substantially perpendicular to the exhaust flow direction. In some implementations, the length is at least about two times the height. In other implementations, the length is less than about 1.5 times the height.

According to some implementations, each of the plurality of nozzles includes a nozzle inlet and nozzle outlet. The nozzle inlets can be substantially coplanar and the nozzle outlets can be substantially coplanar.

In some implementations of the apparatus, the first elongate tubular member includes a central axis and each of the plurality of nozzles is positioned an equal distance radially outward from the central axis.

According to another embodiment, a method for cooling exhaust gas from an internal combustion engine includes urging exhaust gas through a plurality of nozzles, urging exhaust gas from the plurality of nozzles into an exhaust mixing tube, and urging ambient air into the exhaust mixing tube to mix with the exhaust gas. In some instances, the plurality of nozzles are laterally adjacent each other.

According to one implementation, the method also includes creating a pressure drop at an intersection between the plurality of nozzles and the exhaust mixing tube. The ambient air is urged into the exhaust mixing tube via the pressure drop.

In some implementations, exhaust gas is urged through the plurality of nozzles at a first uniform temperature and exits the mixing tube at an average temperature lower than the first uniform temperature. A ratio of a maximum temperature of the exhaust exiting the mixing tube to the average temperature of the exhaust exiting the mixing tube can be between about 1.0 and 1.25.

In an additional embodiment, an engine exhaust system includes an exhaust pipe, an exhaust treatment device, an aspirator, and a tailpipe. The exhaust pipe is in exhaust receiving communication with an internal combustion engine. The exhaust treatment device is in exhaust receiving communication with the exhaust pipe. The aspirator is in exhaust receiving communication with the exhaust treatment device. Moreover, the aspirator includes a housing, a plurality of nozzles in parallel within the housing, and an air entrainment system formed in the housing. The air entrainment system is configured to introduce air into exhaust flowing through the aspirator. The tailpipe is in exhaust receiving communication with an outlet of the aspirator.

In some implementations, the exhaust treatment device includes a particulate matter filter capable of experiencing an active regeneration and a stationary regeneration. During active regeneration, a maximum exhaust temperature to average exhaust temperature ratio at the aspirator outlet can be between about 1.0 and about 1.25. Similarly, during stationary regeneration, a maximum exhaust temperature to average exhaust temperature ratio at the aspirator outlet can be between about 1.0 and about 1.25.

According to yet some implementations, the plurality of nozzles are configured to increase a temperature uniformity of exhaust entering the tailpipe by increasing an exhaust/air mixing efficiency of the aspirator.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided to impart a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Described herein are various embodiments of an exhaust gas aspirator, and associated systems and methods, for cooling exhaust gas prior to exiting the aspirator. Generally, the exhaust gas aspirator includes multiple nozzles that enhance the mixing of entrained ambient air with hot exhaust gas to achieve a more uniform exhaust temperature profile for a given post-nozzle pressure drop and exhaust mixing length as compared with a single nozzle aspirator under the same pressure drop and mixing length constraints. In other words, the exhaust gas aspirator with multiple nozzles of the present application mixes hot exhaust gas and ambient air quicker and more thoroughly than convention aspirators with a single nozzle.

Figure 1:
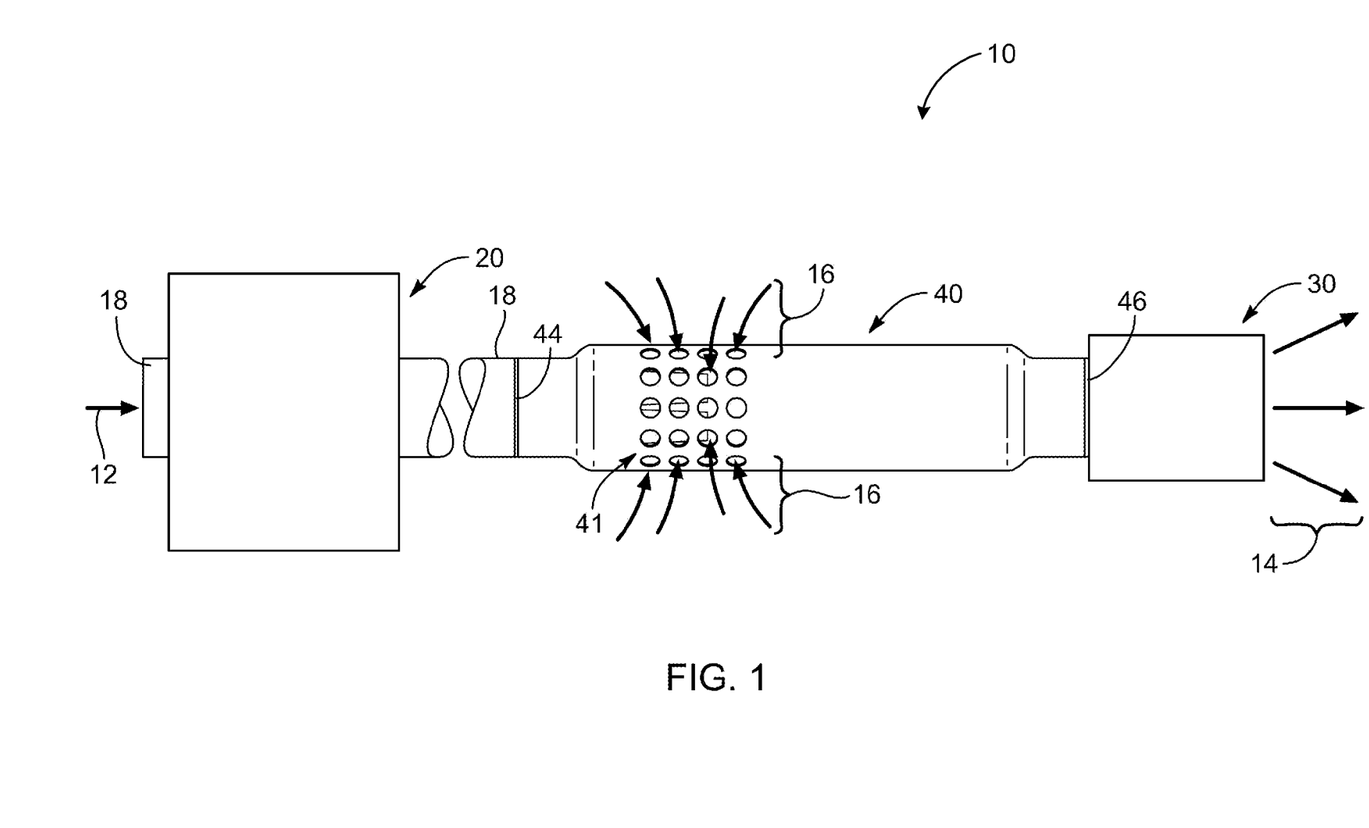
FIG. 1 is a partially schematic side elevational view of an exhaust system according to one representative embodiment.

Referring to FIG. 1, according to one exemplary embodiment, an exhaust system 10 includes an exhaust aftertreatment device 20, a tailpipe device 30, and an exhaust aspirator 40. The components of the exhaust system 10 can be coupled to each other directly or via a length of exhaust pipe, such as exhaust pipe 18. Generally, exhaust gas from an internal combustion engine flows through the exhaust system 10 in a direction indicated by direction arrow 12 and out of the exhaust system 10 to the environment in directions indicated by directional arrows 14. More specifically, the exhaust gas from the engine passes through the exhaust aftertreatment device 20 where one or more properties of the exhaust is modified. The exhaust gas then passes through an inlet 44 of the aspirator 40 after which it is mixed with ambient air entering the aspirator via an air entrainment system 41, as indicated by directional arrows 16. The ambient air and gas mixture 14 exits the aspirator 40 via an outlet 46, passes through the tailpipe device 30, and is released into the environment from the tailpipe device.

The exhaust system 10 can be coupled to the exhaust manifold of an internal combustion engine of a vehicle, such as a semi-trailer truck, passenger car, tractor, plane, and recreational vehicle, or equipment, such as a diesel generator. In vehicle applications, the exhaust system 10 can be coupled to the vehicle in any of various configurations. For example, for some semi-trailer trucks, the tailpipe device 30 can be a tailpipe stack and the exhaust system 10 can be vertically mounted to a side of the truck. Alternatively, for some passenger trucks and cars, the tailpipe device 30 can be a conventional tailpipe and the exhaust system 10 can be horizontally mounted to the undercarriage or side of the vehicle. The exhaust aftertreatment device 20 can be any of various devices, such as diesel oxidation catalysts, NOx adsorbers, SCR catalysts, AMOX catalysts, particulate matter filters, and mufflers.

In some implementations, the exhaust aftertreatment device 20 is a particulate matter filter capable of being regenerated to remove soot and other particulate matter from the filter. Regeneration of the filter can be controlled to occur at any desirable time during operating of the engine and within any desirable operating ranges of the engine. For example, regeneration of the filter can occur while the engine is idling or at low RPM ranges. Such regeneration is defined herein as stationary regeneration. Regeneration of the filter occurring while the engine is operating above idling conditions or at high RPM ranges is defined herein as active regeneration. In the context of exhaust aspiration, the exhaust gas flow rate and the pressure drop at the outlet of the nozzle is lower for stationary regeneration than for active regeneration as will be discussed in more detail below.

Figure 2:
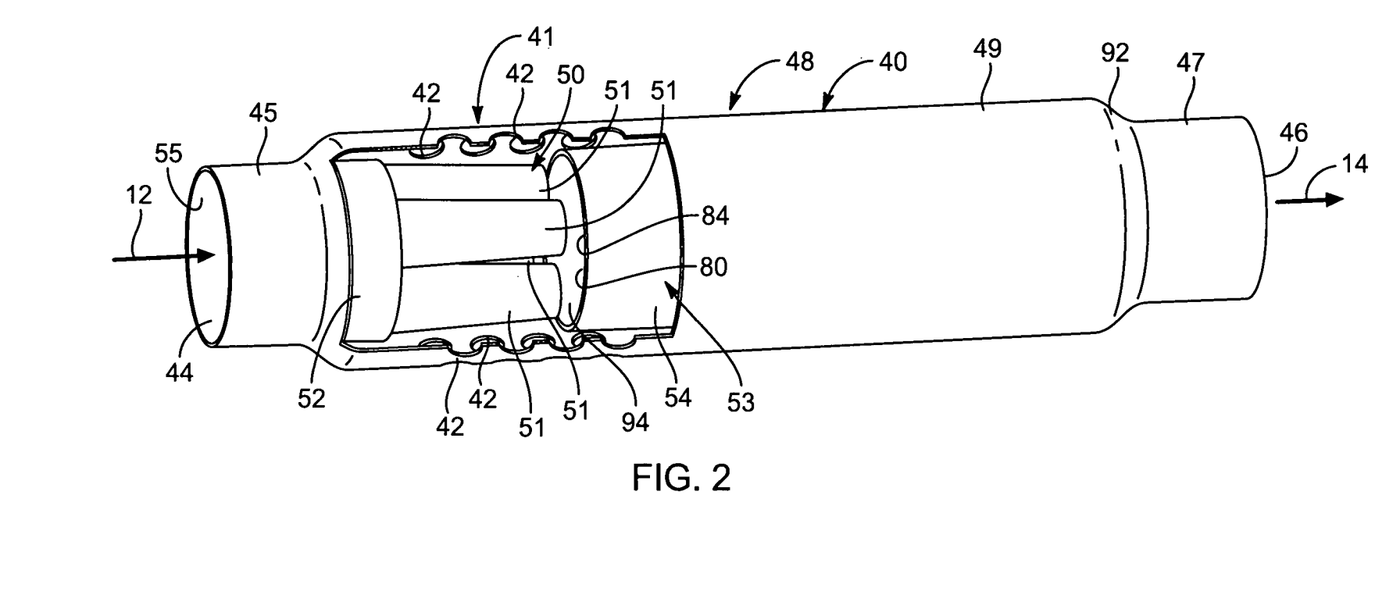
FIG. 2 is a perspective view of an aspirator of the exhaust system of FIG. 1 according to one embodiment with a portion of the aspirator cut away for a more detailed view of an interior of the aspirator.

Referring to FIG. 2, the aspirator 40 includes the air entrainment section 41, a nozzle section 50, and an exhaust expansion section 53. The nozzle section 50 and exhaust expansion section 53 are positioned within a housing 48 extending from an exhaust inlet 44 to an exhaust outlet 46. The housing 48 includes an exhaust inlet section 45 that defines the exhaust inlet 44 and an exhaust outlet section 47 that defines the exhaust outlet 46. The housing 48 further includes an intermediate section 49 extending between the exhaust inlet section 45 and outlet section 47. The aspirator 40 includes a central axis 57 coaxial with a central axis of the housing 48 (see FIGS. 3 and 4).

Generally, the housing 48 is a length of tubing, such as cylindrical tubing having a generally circular cross-section, defining an interior channel 55. In one embodiment, the interior channel 55 has a constant inner diameter or cross-sectional area along the entire length of the housing 48. In other embodiments, such as the illustrated embodiment, the diameter or cross-sectional area of the channel 55 can vary. For example, the inner diameter of the interior channel 55 along the inlet section 45 can be a first diameter and the inner diameter of the interior channel 55 along the intermediate section 49 can be a second diameter larger than the first diameter. Additionally, the inner diameter of the interior channel 55 along the outlet section 47 can be the same as the diameter along the inlet section 45 and/or smaller than the diameter along the intermediate section 49. As shown in FIG. 2, the housing 48 can also include two transition sections 90, 92 intermediate the inlet and outlet sections 45, 47 and the intermediate section 49. The transition section 90 diverges in the exhaust flow direction 12 and the transition section 92 converges in the exhaust flow direction. The housing 40 can include a continuous, unitary length of tubing or multiple sections coupled together, such as by welding and/or using any of various other coupling techniques.

The nozzle section 50 includes a plurality of nozzles 51 extending from a nozzle manifold 52 coupled to the housing 48. The nozzle section 50 is positioned within the interior channel 55 of the housing 48 upstream of the expansion section 53 and downstream of the exhaust inlet 45. The nozzle manifold 52 is configured to couple the nozzles 51 to the housing 48. In the illustrated embodiment, the nozzle manifold 52 has a generally cylindrical cup shape with an open upstream end 66 secured to the housing 48, e.g., the transition section 90, and the closed downstream end 68 secured to the nozzles 51. Preferably, the nozzle manifold 52 is secured to the housing 48 such that an interior channel of the cup is contiguous with the interior channel 55 along the inlet section 45. In this manner, exhaust gas flows substantially unobstructively from the inlet section 45 into the nozzle manifold 52. The closed downstream end 68 includes a plurality of apertures 69 each aligned with a respective one of the nozzles 51. The size and shape of the apertures 69 are the same as the size and shape of an inlet 62 of the nozzles 51 (see FIGS. 3 and 4) such that exhaust gas flows substantially unobstuctively through the nozzle manifold 52 into the respective nozzles 51. In some embodiments, the edges of the apertures 69 are beveled or rounded to facilitate smooth exhaust flow into the nozzles 51.

Figure 3:
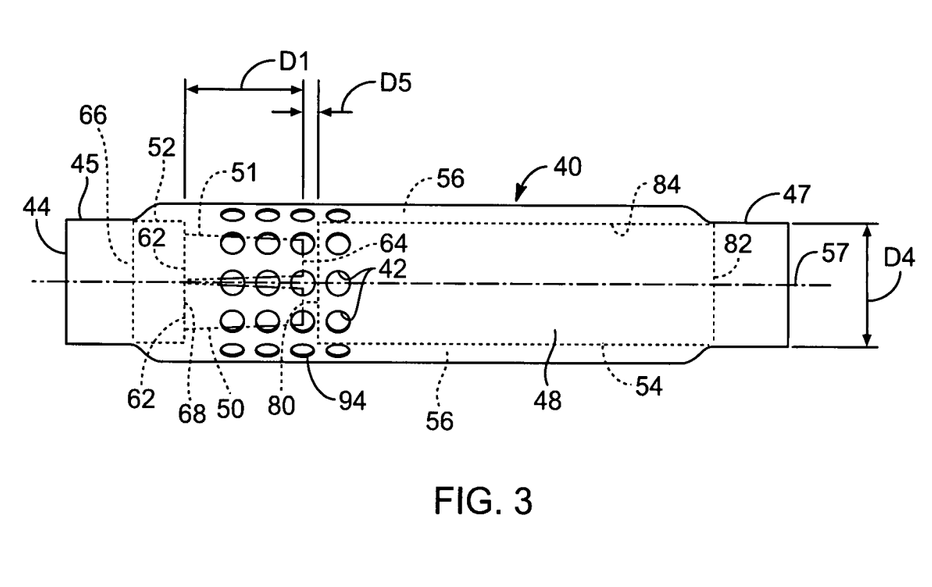
FIG. 3 is a side elevational view of the aspirator of FIG. 2 with some features of the aspirator shown in hidden lines.
Figure 4:
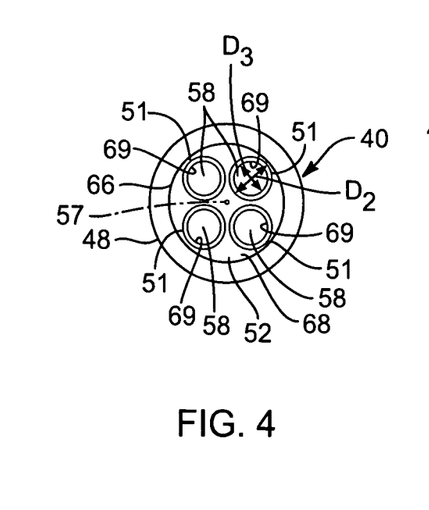
FIG. 4 is a front end view of the aspirator of FIG. 2.

Each nozzle 51 includes an elongate tubular element extending between an exhaust inlet 62 and an exhaust outlet 64 a distance D1 (see FIG. 3). The nozzles 51 each define an interior channel 58 through which exhaust is flowable. The sidewall of the nozzles 51 converge in the exhaust gas flow direction 12. In other words, the cross-sectional area of the interior channel 58 continuously decreases from a maximum cross-sectional area at the exhaust inlet 62 to a minimum cross-sectional area at the exhaust outlet 64. The maximum and minimum cross-sectional areas are defined by maximum and minimum dimensions, such as maximum diameter D2 and minimum diameter D3 for the generally cylindrically shaped nozzles 51 of aspirator 40. The nozzles 51 extend substantially perpendicularly away from the closed downstream end 68 of the nozzle manifold 45 in the exhaust flow direction 12. Further, the nozzles 51 are in parallel with each other, e.g., positioned laterally adjacent each other.

Referring to FIGS. 2 and 3, the exhaust expansion section 53 includes an expansion tube 54 positioned between the nozzle section 50 and the outlet section 47. The expansion tube 54 includes a length of tubing, such as cylindrical tubing having a generally circular cross-section, defining an interior channel 84. The interior channel 84 extends from an expansion tube inlet 80 to an expansion tube outlet 82, and has a diameter D4. The diameter D4, and thus the cross-sectional area, of the expansion tube outlet 82 is larger than the combined minimum diameters D3, and thus the combined cross-sectional area of the nozzles 51 at the nozzle outlets 64. The expansion tube inlet 80 is positioned downstream of the nozzle outlets 64 such that a space 94 having an axial length D5 is defined between the inlet 80 and the outlets 64. The nozzle outlets 64 preferably are spaced apart from the expansion tube inlet 80 to facilitate unimpeded flow of entrained air into the expansion tube 54 as will be explained in more detail below. A distal end of the expansion tube 54 proximate the outlet 82 is secured to the housing 48.

Notwithstanding the need for unimpeded air flow, the space 94 should be small enough such that substantially all of the exhaust gas exiting the nozzles 51 flows into the expansion tube 54. During mid to high RPM operating conditions of the engine, the velocity and momentum of the exhaust gas flowing though the nozzles 51 is sufficient for the exhaust to flow into the expansion tube 54 at large lengths D5. However, during low RPM operating conditions, such as during idling, the velocity of exhaust gas is much lower than during mid to high RPM operating conditions such that if the length D5 is too large, some exhaust exiting the nozzles 51 may not flow passed and not into the expansion tube 54. Accordingly, the length D1 of the nozzles 51 and/or relative positions of the nozzle section 50 and expansion tube 54 can be selected to achieve a length D5 of the space that facilitates a desired amount, e.g., substantially all, of the exhaust flowing through the nozzles to flow into the expansion tube during all operating conditions of the engine.

The position of the nozzles 51 can be defined according to a distance radially away from the central axis 57. For example, referring to FIG. 4, the nozzles 51 are each positioned an equal distance radially away from the central axis 57. In specific implementations, the radial distance can be defined as the distance between the central axis 57 and a geometrical indicator of the nozzle, such as a central axis of the nozzle or the geometric center of the nozzle at the inlet of the nozzle.

The relative position of the nozzles 51 about the closed downstream end 68 of the nozzle manifold 45 is based at least partially on the number, shape, and size of the nozzles. In the illustrated embodiment of FIGS. 2-4, the nozzle section 50 includes four nozzles 51 each having a circular cross-section. The nozzles 51 are spaced evenly about the central axis 57 of the aspirator 40, i.e., positioned an equal distance from each other. Although the nozzle section 50 includes four circular nozzles, in other embodiments, the nozzle section can include less or more than four nozzles and have any of various cross-sectional shapes. For example, FIGS. 5-12 illustrate various embodiments of nozzle sections with various nozzle configurations.

Figure 5:
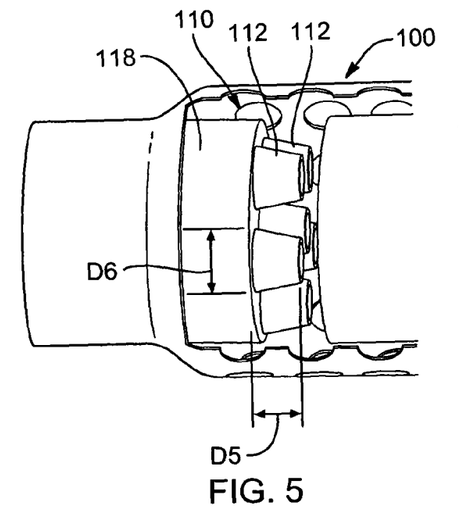
FIG. 5 is a perspective view of an aspirator according to one embodiment with a portion of the aspirator cut away for a more detailed view of an interior of the aspirator.
Figure 6:
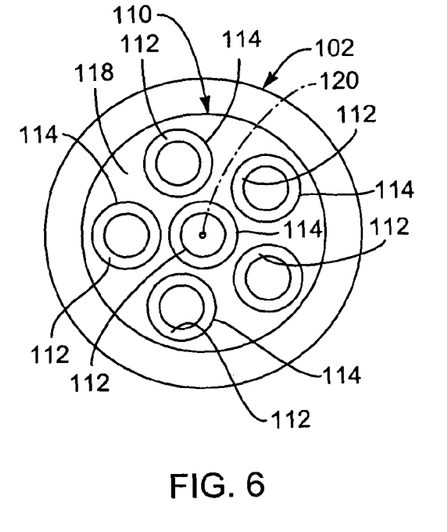
FIG. 6 is a front end view of the aspirator of FIG. 5.

Referring to FIGS. 5 and 6, an exhaust aspirator 100 according to one embodiment includes a nozzle section 110 with six nozzles 112. The nozzles 112 extend from a nozzle manifold 118 in the exhaust flow direction, e.g., exhaust flow direction 12. As shown in FIG. 6, the nozzle manifold 118 includes apertures 114 coextensive with the nozzles 112. The edges of the apertures 114 can be curved or rounded to facilitate relatively smooth flow of exhaust into the nozzles.

The nozzle section 110 includes five nozzles 112 positioned about a central axis 120 of the aspirator an equal distance radially away from the central axis and one nozzle coaxial with the central axis. The nozzles 112 each have a generally circular cross-sectional shape similar to nozzles 51. However, the lengths D5 of the nozzles 112 are significantly smaller than the lengths of the nozzles 51. In other words, a length D5 to maximum diameter D6 ratio of the nozzles 112 is significantly smaller than a length D1 to maximum diameter D2 ratio of the nozzles 51. In some implementations, the shorter nozzles 112 tend to increase the acceleration of the exhaust gas passing through the nozzles 12 such that the same or similar pressure drops can be obtained at the outlets of the nozzles 112 as with longer nozzles, such as nozzles 51, but using a much smaller axial space than longer nozzles. Accordingly, in some instances, the use of shorter nozzles 112 corresponds to shorter and more compact aspirators. Additionally, using a greater number of nozzles 112 (e.g., five verses the four nozzles of the aspirator 40) increases the surface area for hot exhaust gas to mix with the cold entrained air resulting in an enhanced temperature uniformity at the aspirator outlet.

Figure 7:
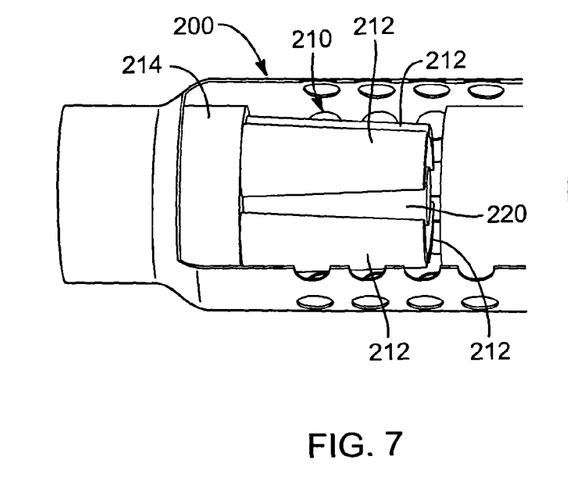
FIG. 7 is a perspective view of an aspirator according to another embodiment with a portion of the aspirator cut away for a more detailed view of an interior of the aspirator.
Figure 8:
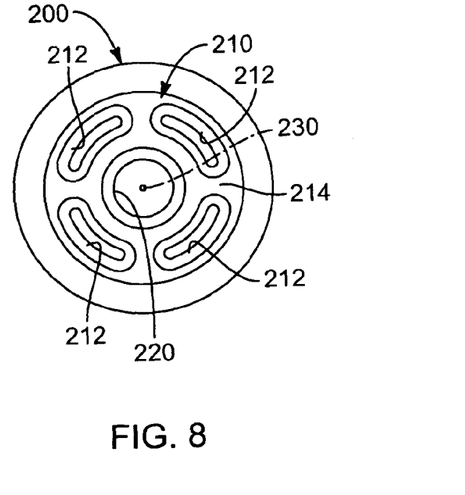
FIG. 8 is a front end view of the aspirator of FIG. 7.

Referring to FIGS. 7 and 8, an exhaust aspirator 200 according to one embodiment includes a nozzle section 210 with four peripheral nozzles 212 and one central nozzle 220. The nozzles 212, 220 extend from a nozzle manifold 214 in the exhaust flow direction, e.g., exhaust flow direction 12. The four peripheral nozzles 212 are positioned about a central axis 230 of the aspirator 200 an equal distance radially away from the central axis and the nozzle 220 is coaxial with the central axis. The nozzles 212 have a generally bean, arcuate, or elliptical shape with the concave side of the nozzles facing the central axis and the opposing convex side facing away from the central axis. The nozzle 220 has a generally circular cross-sectional shape. Accordingly, the nozzle section 214 is one example of a nozzle section having dissimilar nozzle shapes. Other nozzle sections can have any of various dissimilar nozzle shapes and configurations as desired.

In the illustrated embodiment, the central nozzle 220 has larger minimum and maximum cross-sectional areas than the peripheral nozzles 212 such that more exhaust flows through the central nozzle than any one of the peripheral nozzles. In some instances, the nozzles 220, 212 are sized such that more exhaust flows through the central nozzle 220 than the peripheral nozzles 212 combined. Accordingly, the central nozzle 220 can be defined as a primary nozzle and the peripheral nozzles 212 can be defined as secondary nozzles. Moreover, the bean shape of the peripheral nozzles 212 increases the surface area for the exhaust gas to mix with the entrained cold air, and thus increases the uniformity at the aspirator outlet, while the central 220 maintains the hot core of the exhaust gas stream in the middle of the aspirator. Therefore, the aspirator 200 configuration illustrated in FIGS. 7 and 8 can be particularly advantageous in applications where the prevention of bluing may be more desirable than uniform cooling of the exhaust gas. The level of bluing versus temperature uniformity/cooling can be modified by changing the dimensions of the nozzles, such as the respective areas of the nozzles.

Figure 9:
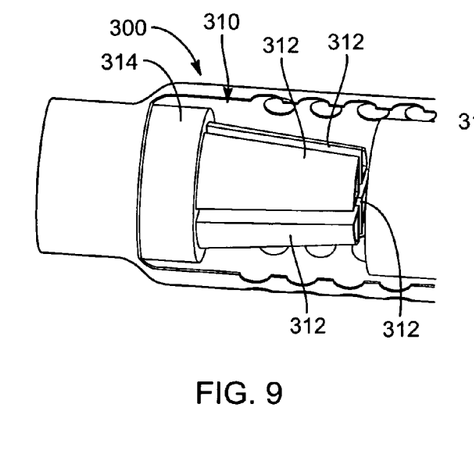
FIG. 9 is a perspective view of an aspirator according to yet another embodiment with a portion of the aspirator cut away for a more detailed view of an interior of the aspirator.
Figure 10:
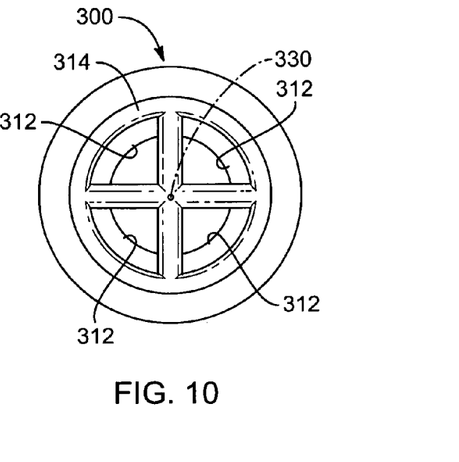
FIG. 10 is a front end view of the aspirator of FIG. 9.

Referring to FIGS. 9 and 10, an exhaust aspirator 300 according to one embodiment includes a nozzle section 310 with four nozzles 312. The nozzles 312 each extend from a nozzle manifold 314 in the exhaust flow direction. The four nozzles 312 are positioned about a central axis 330 of the aspirator 300 an equal distance radially away from the central axis. Each nozzle 312 has a generally quadrant or circular section shape. Further, each nozzle 312 includes a curved surface coupled to two straight surfaces. In the exhaust flow direction, the straight surfaces remain a constant distance away from the central axis 330, while the curved surface converges toward the straight surface. In other embodiments, however, the curved and straight surfaces converge toward each other in the exhaust flow direction. The quadrant nozzle configuration depicted in the exhaust aspirator 300 provides increased mixing of the exhaust gas and entrained air compared to single nozzle aspirators. Further, this configuration tends to maintain the hot core of the exhaust gas within the middle of the exhaust gas stream to reduce bluing of the tailpipe in exhaust receiving communication with the aspirator outlet.

Figure 11:
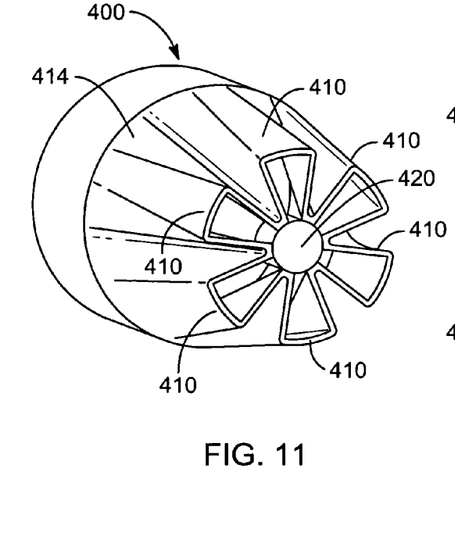
FIG. 11 is a perspective view of a nozzle section of an aspirator according to one embodiment.
Figure 12:
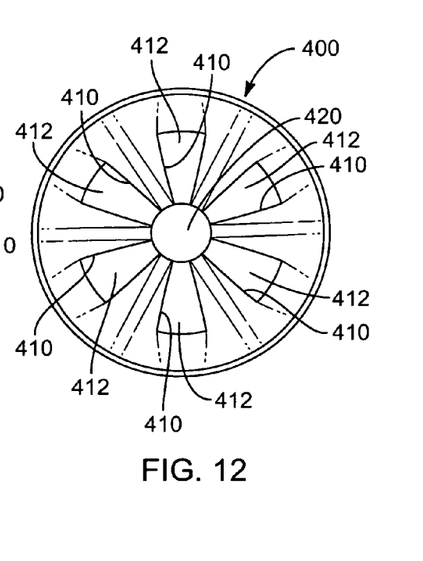
FIG. 12 is a front end view of the nozzle section of FIG. 11.

Referring now to FIGS. 11 and 12, a nozzle section 400 is shown according to one embodiment. The nozzle section 400 is configured to be placed within a housing of an aspirator. For example, the nozzle section 400 can replace any one of the nozzle sections of the aspirators 40, 100, 200, 300. The nozzle section 400 includes a plurality of lobes 410 extending from a nozzle manifold 414 in the exhaust flow direction. The lobes 410 are similar to the nozzles 51, 112, 212, 312 in that each lobe defines a converging or tapering channel 412 through which exhaust is accelerated. However, the lobes 410 are different than the nozzles 51, 112, 212, 312 in that each lobe does not define a self-contained, disparate channel separate from the other lobes along the entire length of the lobes. Rather, the lobes 410 define channels 412 that share a common central region with each other along a substantial length of the lobes. The lobes 410 are coupled together by a central hub 420 proximate the outlets of the lobes. The central hub 420 has an axial length such that each lobe 410 defines a self-contained, disparate channel 412 along the length of the hub. In this manner, the nozzle section 400 includes a plurality of separate lobes or nozzles and not a single fluted outlet or nozzle. Such a configuration promotes increased mixing between exhaust gas and entrained air, as well as decreased bluing at the tailpipe, compared with single nozzle aspirators.

Although many of the nozzle patterns discussed above are symmetric, the nozzle patterns need not be symmetric to realize the advantages of the aspirators discussed herein. Moreover, the nozzles need not be equidistant from or coaxial with a central axis of the aspirator to realize these same advantages.

Referring back to FIG. 2, the air entrainment system 41 includes a plurality of apertures 42 formed in intermediate section 49 of the housing 48. The apertures include an inlet exposed to the atmosphere and an outlet exposed to the interior of the housing 48. The apertures 42 are configured to facilitate flow of ambient air from the atmosphere into the housing 48. Preferably, at least some of the apertures 42 at least partially surround or are approximately radially outward from the space between the nozzle outlets 64 and the expansion tube 54 inlet 80. In the illustrated embodiment, the apertures 42 include four sets of apertures 42 each including a plurality of apertures circumferentially aligned about a periphery of the housing 48. As shown in FIG. 3, two aperture sets are positioned upstream of the nozzle outlets 64, one aperture set is positioned downstream of the expansion tube inlet 80, and one aperture set is positioned radially outwardly from the nozzle outlets 64.

Although the illustrated embodiments show four sets of apertures 42 each having identically sized apertures spaced an equal distance apart from each other, in other embodiments, the apertures of the air entrainment section need not be of the same size or spaced an equal distance apart from each other. Moreover, the apertures can be any of various sizes and shapes capable of facilitating a sufficient amount or flow rate of ambient air to achieve desired exhaust aspirator performance characteristics.

In operation, exhaust gas generated by an internal combustion engine flows from the engine into the exhaust system 10. Referring to FIG. 1, the exhaust gas from the engine first flows in the exhaust flow direction indicated by arrow 12 through the one or more aftertreatment devices 18 before entering the inlet 44 of the exhaust gas aspirator 40 at a first uniform exhaust gas temperature. After entering the aspirator 40, the exhaust gas flows through the inlet section 45 and into the nozzle manifold 52. From the nozzle manifold 52, the exhaust gas is separated from a single flow stream into multiple flow streams by entering a respective one of the nozzles 51 via the nozzle inlets 62. As the exhaust gas flows through the nozzles 51, the converging side walls, e.g., decreasing cross-sectional areas, of the nozzles 51 accelerates the exhaust gas such that the velocity of the exhaust gas at the outlets 64 of the nozzles is more than the velocity of the exhaust gas at the inlets 62 of the nozzles. The increase in velocity corresponds with a reduction in the pressure of the exhaust gas and an overall pressure drop across the nozzles 51. In other words, the pressure at the outlets 64 of the nozzles 51 is less than the pressure at the inlets 62 of the nozzles.

From the nozzles 51, the exhaust gas flows past the space 94 and through the inlet 80 into the expansion or mixing tube 54. As the exhaust gas exits the nozzles 51 through the outlets 64, the exhaust gas is allowed to at least partially expand as it passes through the space 94. As the exhaust gas expands, the pressure of the exhaust increases, thus creating an area of negative pressure between the nozzle outlets 64 and the inlet 80 of the expansion tube 54. The negative pressure acts as a vacuum to draw in ambient air 16 through the apertures 42 of the air entrainment section 41. The ambient air 16 is entrained and mixed with the exhaust gas flowing into the expansion tube 54. The exhaust gas and ambient air continue to mix with each other as the ambient air and exhaust gas mixture flow through the interior channel 84 of the expansion tube. Because the ambient air is cooler than the exhaust gas, mixing of the ambient air with the exhaust gas acts to reduce the temperature of the exhaust gas. The exhaust gas and ambient air mixture then flows out of the expansion tube 54 via the outlet 82, through the outlet section 47, and out of the aspirator 40 via the outlet 46.

As discussed above, the multiple nozzles 51 facilitate enhanced mixing of the exhaust gas and ambient air compared with single nozzle aspirators. An exhaust stream includes a central core where the hottest temperatures are found. As ambient air is entrained with an exhaust flow, the air initially mixes with the exhaust located at a periphery of the exhaust flow stream radially away from the core and works its way radially inward to cool the central core. Accordingly, the central core of an exhaust gas stream is typically the last to be cooled by the ambient air. Typically, single nozzle aspirators produce an exhaust gas flow stream with a single large central core. Therefore, mixing of the ambient air with the exhaust gas making up the core of the single exhaust gas stream occurs a significant amount of time after the initial mixing. Therefore, for standard length aspirators, the maximum temperature and temperature gradient of exhaust gas exiting a single nozzle aspirator can be quite high.

In contrast to single nozzle aspirators, multiple nozzle aspirators as described herein separate the exhaust flow stream into multiple small streams each having a smaller central core that may be positioned closer to the outer periphery of the interior channel 84 of the expansion tube 54 (away from the central axis 57) and thus closer to the supply of ambient air. Because the central cores are smaller and, in some implementations, positioned away from the central axis of the aspirator, the ambient air is able to mix with and cool the central cores of the exhaust gas stream faster. Therefore, for a given aspirator length, pressure drop, and aspirator inlet exhaust conditions, the uniformity is higher and the maximum exhaust temperature is lower at the outlet of the multiple nozzle aspirators compared with single nozzle aspirators.

As discussed above, the aspirator with multiple nozzles described herein promotes ambient air and exhaust gas mixing, exhaust cooling, and exhaust temperature uniformity at the outlet of the aspirator. Generally, the exhaust temperature uniformity index of an aspirator is dependent on the exhaust/air mixing efficiency of the aspirator. As the mixing efficiency of the aspirator improves, the uniformity index decreases to indicate a more uniform temperature at the outlet of the aspirator.

Figure 13:
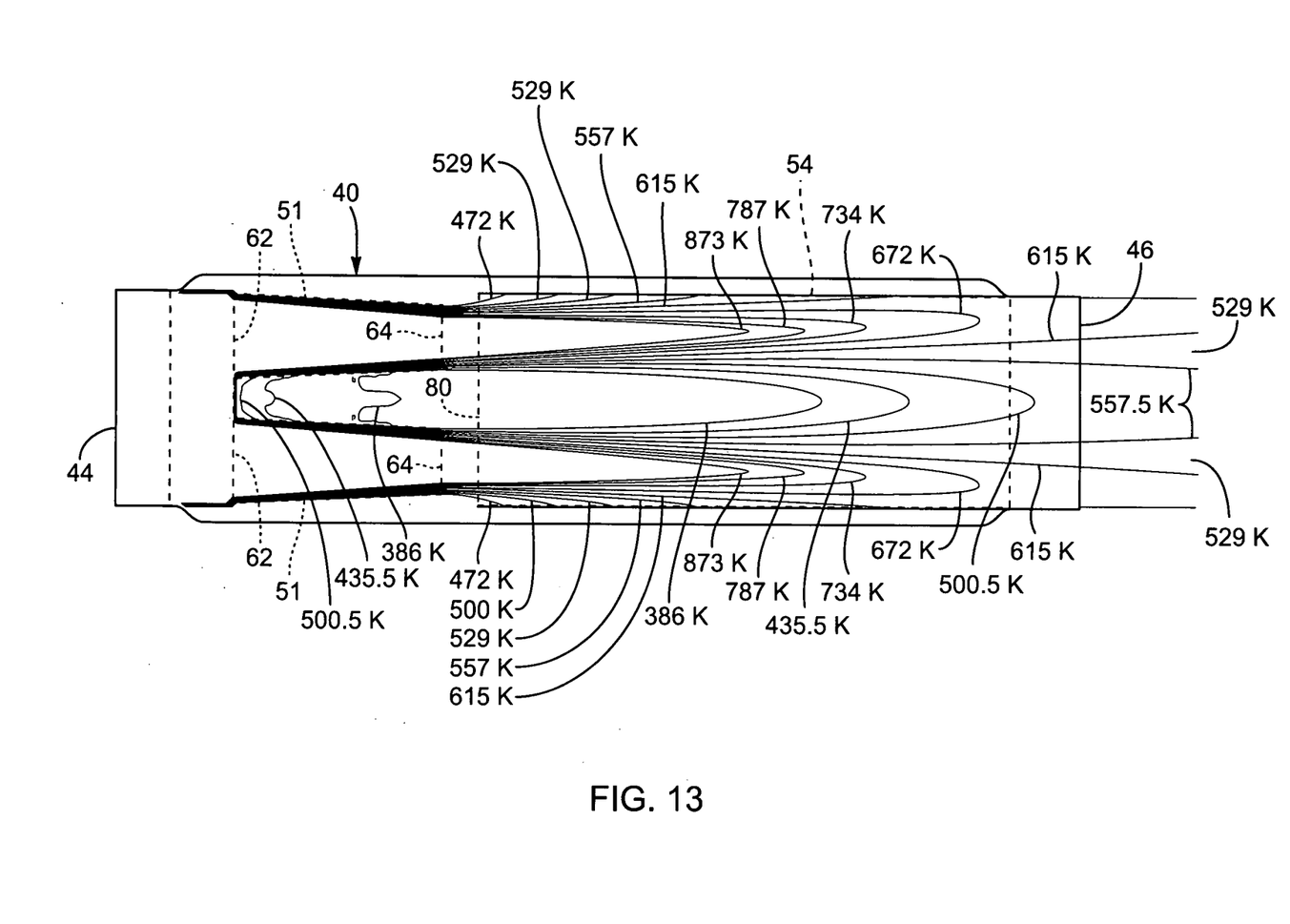
FIG. 13 is a simulated exhaust temperature profile of the aspirator of FIG. 2 according to one implementation with the aspirator shown in hidden lines.

The mixing, cooling, and temperature uniformity performance of the aspirator 40 and a conventional single-nozzle aspirator having identical system constraints were simulated and the performance results were compared. FIG. 13 illustrates a simulated exhaust temperature profile for the aspirator 40 having a given nozzle length D1, a maximum combined nozzle area (at the inlets 62), a minimum combined nozzle area (at the outlets 64), an expansion tube cross-sectional area and length, an overall aspirator length, and a space length D5, as well as a given exhaust inlet temperature and flow rate. The test simulated an active regeneration condition.

Figure 14:
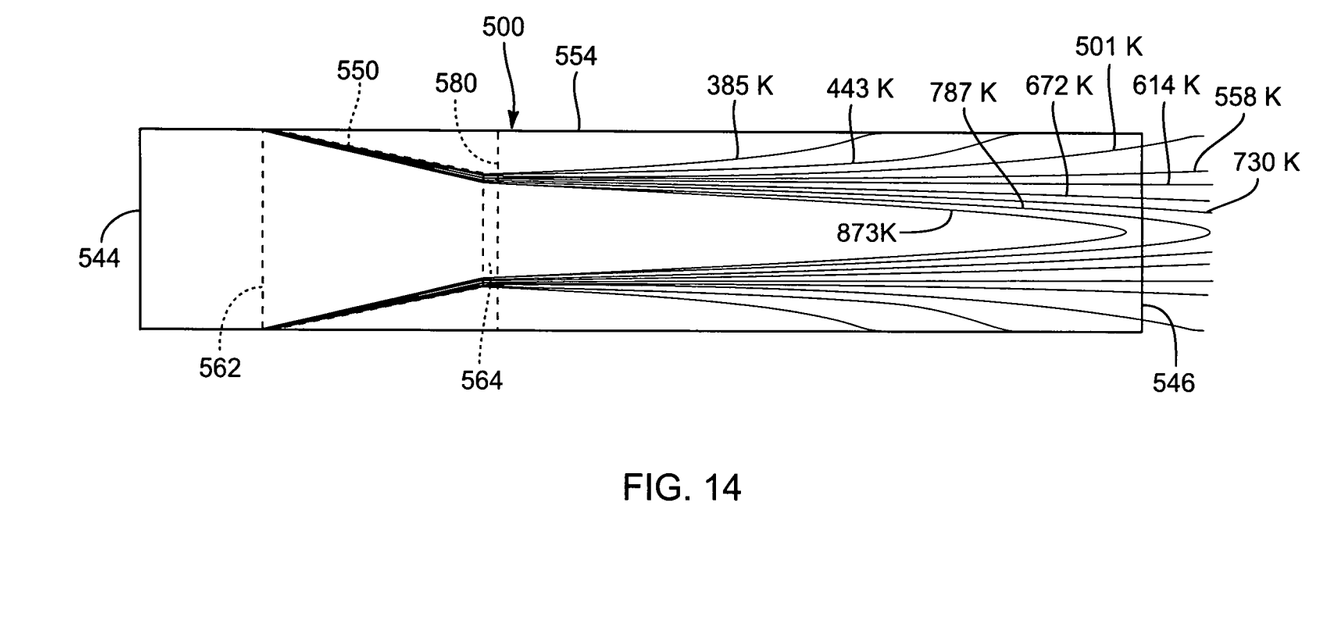
FIG. 14 is a simulated exhaust temperature profile of a prior art aspirator having a single nozzle with the aspirator shown in hidden lines.

Similarly, FIG. 14 illustrates a simulated exhaust temperature profile for a single-nozzle aspirator 500 during an active regeneration condition. The aspirator 500 includes some similarities to the tested aspirator 40, but the aspirator 500 includes only a single nozzle 550 having a nozzle inlet 562 and outlet 565. The aspirator 500 further includes an exhaust inlet 544 and outlet 546, as well as an exhaust expansion section 554 having an inlet 580 spaced-apart from the outlet 564 of the nozzle 550. The single-nozzle aspirator 500 was tested using the same system constraints as the aspirator 40, including the inlet exhaust temperature and exhaust flow rate. In other words, the length of the nozzle 550 is equal to given nozzle length D1, the maximum nozzle area (at the inlet 562) is the same as the combined maximum nozzle area of the tested aspirator 40, the minimum nozzle area (at the outlet 564) is the same as the combined minimum nozzle area of the tested aspirator 40, the expansion tube cross-sectional area and the overall aspirator length is the same as the tested aspirator 40, and the space between the nozzle outlet and expansion tube inlet is the same as the given space length D5.

As visually indicated in the FIGS. 13 and 14, the uniformity of the exhaust temperature at the outlet 46 of the aspirator 40 with multiple smaller nozzles 41 is greater than at the outlet 546 of the aspirator 500 with a single larger nozzle 550. In other words, the temperature gradient, i.e., the degree of change between the exhaust temperatures, at the aspirator outlets is lower for the multiple nozzle aspirator 40 than for the single nozzle aspirator 500. Additionally, the temperatures of the exhaust across the outlet 46 of the multiple nozzle aspirator 40 (e.g., 615 K, 557, 530 K) are significantly lower than the majority of the temperatures of the exhaust across the outlet 546 of the single nozzle aspirator 500 (e.g., 787 K, 730 K, 672 K).

Figure 15:
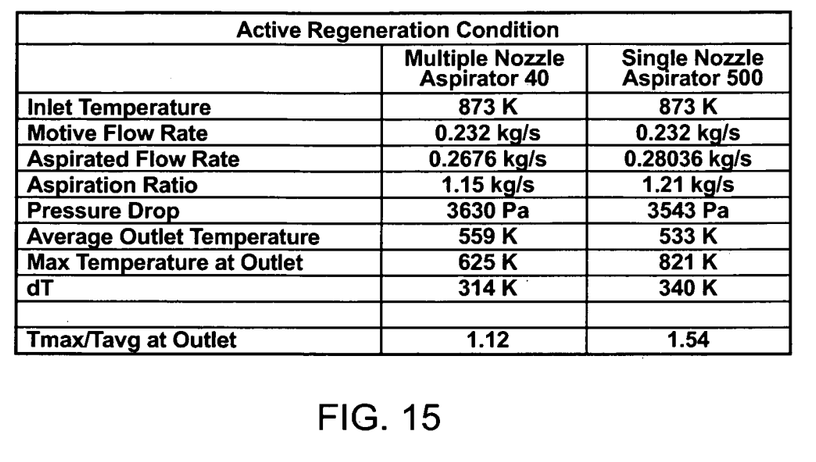
FIG. 15 is a table of testing conditions and results for thermal imaging tests simulating an active particulate filter regeneration condition for simulated embodiments of the aspirator of FIG. 2 and the prior art aspirator of FIG. 14, which corresponds to the simulated exhaust temperature profiles of FIGS. 13 and 14, respectively.

FIG. 15 shows the numerical results of the tests, which indicate that for a given exhaust inlet temperature (i.e., 873 K (600° C.)) and exhaust flow rate (i.e., 0.232 kg/s), an exhaust temperature uniformity index, i.e., the ratio of the maximum exhaust temperature at the aspirator outlet to the average exhaust temperature at the aspirator outlet, is lower for the multiple nozzle aspirator 40 (i.e., 1.12) than for the single nozzle aspirator (i.e., 1.54). Accordingly, the exhaust temperature is more uniform at the outlet of the multiple nozzle aspirator 40 than for the single nozzle aspirator 500 for the same set of given constraints, including the same air entrainment flow rate (i.e., 0.2676 kg/s) and exhaust pressure drop (i.e., 3.63 kPa) at the outlet of the respective nozzles. The disparity between the exhaust temperature uniformity index between the two aspirators 40, 500 can be attributed to the enhanced ambient air and exhaust gas mixing resulting from exhaust flow through multiple nozzles when compared with a single nozzle.

Corresponding to the increased exhaust temperature uniformity index, the maximum temperature of the exhaust at the outlet 46 of the multiple nozzle aspirator 40 (i.e., 626 K (352° C.)) is significantly lower than the maximum temperature of the exhaust at the outlet 546 of the single nozzle aspirator 500 (i.e., 821 K (548° C.)). Because the maximum temperature of the exhaust gas at the outlet of the multiple nozzle aspirator 40 is significantly lower than the single nozzle aspirator 500, the risk of fire hazards and bluing of the exhaust tailpipe also is significantly lower for the multiple nozzle aspirator 40 than for the single nozzle aspirator 500.

Figure 16:
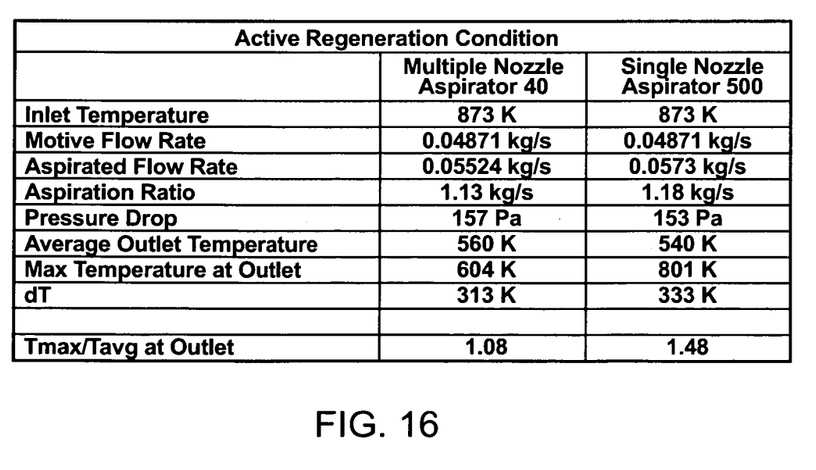
FIG. 16 is a table of testing conditions and results for a thermal imaging test simulating a stationary particulate filter regeneration condition for simulated embodiments of the aspirator of FIG. 2 and the prior art aspirator of FIG. 14.

Similar to the test simulating operating conditions for the multiple nozzle aspirator 40 and single nozzle aspirator 500 during active regeneration of the particulate matter filter discussed above, a test simulating operating conditions for the aspirators 40, 500 during stationary regeneration was performed for comparative purposes. The numerical results of the stationary regeneration simulation are shown in FIG. 16. As shown, although the temperature of the exhaust at the inlet of the aspirators 40, 500 is the same as the active regeneration test (i.e., 873 K (600° C.)), the exhaust gas flow rate through the aspirators was significantly less (i.e., 0.04871 kg/s compared with 0.232 kg/s). The lower exhaust flow rate resulted in a lower pressure drop after the nozzle outlet(s) (i.e., 156.55 Pa for the aspirator 40 and 153.021 Pa for the aspirator 500) and a lower entrained air flow rate (i.e., 0.05524 kg/s for the aspirator 40 and 0.0573 kg/w for the aspirator 500). Notwithstanding the lower exhaust flow rate, pressure drop, and entrained air flow rate in the stationary regeneration test, the resulting exhaust gas temperature uniformity index in the stationary regeneration test (i.e., 1.08) for the aspirator 40 was similar to the resulting uniformity index in the active regeneration test. Further, as with the active regeneration tests, the exhaust gas temperature uniformity index and maximum exhaust outlet temperature in the stationary regeneration tests for the multiple nozzle aspirator 40 are significantly lower than for the single nozzle aspirator 500. Based on the results of the stationary regeneration test, the multiple nozzle aspirator 40 achieves similar exhaust gas cooling and mixing properties whether an active or stationary regeneration event is being performed on the particulate matter filter of the exhaust system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An aspirator for cooling exhaust gas from an internal combustion engine, comprising:
    a nozzle section communicable in exhaust receiving communication with the internal combustion engine, the nozzle section comprising a plurality of nozzles through which an exhaust gas stream is flowable, wherein the plurality of nozzles are positioned laterally adjacent each other, each nozzle comprising an exhaust inlet end and exhaust outlet end, and wherein the nozzle section further comprises a nozzle manifold defining an outer periphery, the plurality of nozzles being coupled to and extending from the nozzle manifold, and wherein the plurality of nozzles define a collective outer periphery encompassing the plurality of nozzles, the collective outer periphery of the plurality of nozzles at the exhaust outlet end being smaller than the outer periphery of the nozzle manifold;
    an expansion section communicable in exhaust receiving communication with the plurality of nozzles, the expansion section comprising an expansion tube having an exhaust inlet end and an exhaust outlet end;
    a housing tube within which the nozzle section and expansion section are positioned; and
    an air entrainment section communicable in air supplying communication with the expansion section, the air being mixable with the exhaust gas within the expansion section, wherein the air entrainment section comprises a plurality of apertures formed in the housing tube;
    wherein the exhaust inlet end of the expansion tube is positioned downstream of the exhaust outlet ends of the plurality of nozzles such that an axial space is defined between the exhaust inlet end of the expansion tube and the exhaust outlet ends of the plurality of nozzles.

2. The aspirator of claim 1, wherein each of the plurality of nozzles comprises a converging portion in a direction of exhaust gas flow.

3. The aspirator of claim 1, wherein the plurality of nozzles comprises at least four nozzles.

4. The aspirator of claim 1, wherein the nozzles are similarly shaped.

5. The aspirator of claim 1, wherein at least one of the plurality of nozzles defines a cross-sectional area having a first shape and at least one of the plurality of nozzles defines a cross-sectional area having a second shape, the first shape being different than the second shape.

6. The aspirator of claim 1, wherein each of the plurality of nozzles defines a cross-sectional area having a substantially circular shape.

7. The aspirator of claim 1, wherein each of the plurality of nozzles defines a cross-sectional area having a substantially conical frustum shape.

8. The aspirator of claim 1, wherein each of the plurality of nozzles defines a cross-sectional area having a substantially bean shape.

9. The aspirator of claim 1, wherein each of the plurality of nozzles defines a cross-sectional area having a substantially triangular shape.

10. The aspirator of claim 1, wherein the air entrainment section comprises a plurality of apertures exposed to ambient air, the air entrainment section at least partially surrounding the plurality of nozzles and expansion section.

11. An engine exhaust system, comprising:
an exhaust pipe in exhaust receiving communication with an internal combustion engine;
an exhaust treatment device in exhaust receiving communication with the exhaust pipe;
an aspirator in exhaust receiving communication with the exhaust treatment device, the aspirator comprising:
- a housing comprising an elongate tube;
- a nozzle section communicable in exhaust receiving communication with the internal combustion engine, the nozzle section comprising a plurality of nozzles in parallel within the housing, the plurality of nozzles being positioned within the housing laterally adjacent each other, each nozzle comprising an inlet end and an outlet end, each nozzle being positioned about a central hub that is coaxial with the elongate tube, wherein exhaust gas is not flowable through the central hub, and wherein the nozzle section further comprises a nozzle manifold defining an outer periphery, the plurality of nozzles being coupled to and extending from the nozzle manifold, and wherein the plurality of nozzles define a collective outer periphery encompassing the plurality of nozzles, the collective outer periphery of the plurality of nozzles at the exhaust outlet end being smaller than the outer periphery of the nozzle manifold;
- an expansion tube positioned coaxially within the elongate tube, the expansion tube comprising an inlet end and an outlet end, wherein the expansion tube is positioned relative to the plurality of nozzles such that the inlet end of the expansion tube is positioned downstream of the outlet ends of the plurality of nozzles and a space having an axial length is defined between the inlet end of the expansion tube and the outlet ends of the plurality of nozzles; and
- an air entrainment system formed in the housing and configured to introduce air into exhaust flowing through the aspirator; and
a tailpipe in exhaust receiving communication with an outlet of the aspirator.

12. The engine exhaust system of claim 11, wherein:
the exhaust treatment device comprises a particulate matter filter capable of experiencing an active regeneration; and
during active regeneration, a maximum exhaust temperature to average exhaust temperature ratio at the aspirator outlet is between about 1.0 and about 1.25.

13. The engine exhaust system of claim 11, wherein:
the exhaust treatment device comprises a particulate matter filter capable of experiencing a stationary regeneration; and
during stationary regeneration, a maximum exhaust temperature to average exhaust temperature ratio at the aspirator outlet is between about 1.0 and about 1.25.

14. The engine exhaust system of claim 11, wherein the plurality of nozzles are configured to increase a temperature uniformity of exhaust entering the tailpipe by increasing an exhaust/air mixing efficiency of the aspirator.

15. An aspirator for cooling exhaust gas from an internal combustion engine, comprising:
- a nozzle section communicable in exhaust receiving communication with the internal combustion engine, the nozzle section comprising a plurality of nozzles through which an exhaust gas stream is flowable, wherein the plurality of nozzles are positioned laterally adjacent each other, each nozzle comprising an exhaust inlet end and exhaust outlet end, wherein each of the plurality of nozzles comprises a cross-sectional shape entirely bounded by two radii of a circle and an arc of the circle between the radii, and wherein the nozzle section further comprises a nozzle manifold defining an outer periphery, the plurality of nozzles being coupled to and extending from the nozzle manifold, and wherein the plurality of nozzles define a collective outer periphery encompassing the plurality of nozzles, the collective outer periphery of the plurality of nozzles at the exhaust outlet end being smaller than the outer periphery of the nozzle manifold;
- an expansion section communicable in exhaust receiving communication with the plurality of nozzles, the expansion section comprising an expansion tube having an exhaust inlet end and an exhaust outlet end;
- a housing tube within which the nozzle section and expansion section are positioned; and
- an air entrainment section communicable in air supplying communication with the expansion section, the air being mixable with the exhaust gas within the expansion section, wherein the air entrainment section comprises a plurality of apertures formed in the housing tube;
wherein the exhaust inlet end of the expansion tube is positioned downstream of the exhaust outlet ends of the plurality of nozzles such that an axial space is defined between the exhaust inlet end of the expansion tube and the exhaust outlet ends of the plurality of nozzles.

16. The aspirator of claim 15, wherein a curved surface defined by the arc of the circle between the radii of each of the plurality of nozzles converges toward a central axis of the nozzle section in an exhaust flow direction.

17. The aspirator of claim 16, wherein the flat surfaces defined by the two radii of the circle of each of the plurality of nozzles remain at a constant distance away from the central axis of the nozzle section in the exhaust flow direction.

* * * * *